Patented Mar. 18, 1947

2,417,576

UNITED STATES PATENT OFFICE 2,417,576

MANUFACTURE OF VISCOUS PROTEIN SOLUTIONS FOR THE PRODUCTION OF ARTIFICIAL FILAMENTS

Robin H. K. Thomson, Kilwinning, and Stanley R. Swift, Saltcoats, Scotland, assignors to Imperial Chemical Industries Limited, a corporation of Great Britain No Drawing. Application March 14, 1944, Serial No. 526,486. In Great Britain April 12, 1943

3 Claims. (Cl. 106—154)

The present invention relates to the manufacture of viscous aqueous caustic alkaline solutions of peanut globulins adapted for extrusion through fine orifices into coagulating baths for the production of textile filaments.

The first filaments to be spun from peanut globulins were those obtained by dissolving the peanut protein in concentrated aqueous solutions of urea and ageing the solution. It is believed that the molecules of peanut globulin are of a coiled structure characteristic of globular proteins, and that the increase in viscosity which took place on ageing the solution of the protein in the aqueous urea solvent, indicates a transformation of the molecular structure into an uncoiled and extended state, a change sometimes referred to as denaturation, and that unless such a transformation of the molecular structure is at least initiated no filament can result. Concentrated aqueous solutions of urea appear to have a remarkable facility for denaturing the protein, but the high urea concentration required for the production of the filaments renders their employment more expensive than is desirable for technical application.

It has also been proposed to produce filaments by extruding into a coagulating bath the viscous thixotropic solutions obtained by heating and mechanically working dispersions of peanut protein in dilute aqueous ammonia. While this process has led to the production of excellent bristles and the like thick filaments, it has been less successful in its application to the production of the thin filaments required for textile purposes, which are drawn off from the spinneret at a rate substantially exceeding the rate of extrusion and are subjected to considerable tension at certain stages of their manufacture. While it is usually necessary to maintain the thixotropic ammoniacal solutions under shear to prevent them from gelating, no difficulty is experienced in selecting suitable concentrations of ammonia for the production of the solution to be extruded.

In the case of caustic alkaline solutions of peanut protein, on the contrary, the extreme sensitivity of the condition of the solution to slight changes in the caustic alkaline concentration and the variation of the appropriate caustic alkaline concentration required for differing concentrations of the peanut globulin for years rendered the problem of preparing suitable caustic alkaline solutions for spinning a very difficult problem. When the caustic alkaline concentration is outside the narrow permissible limits, the solution is either of inappreciable viscosity, or, if viscous when first made up, undergoes such rapid changes in viscosity as to be useless for technical purposes, either thickening uncontrollably until it gelates, or thinning down to inappreciable viscosity.

Proposals made in British Patent 537,740 have, however, greatly facilitated the production of spinnable caustic alkaline solutions of peanut globulins. This specification discloses that spinnable solutions can only be obtained if, when the protein solution is freshly made up, it has a pH of at least 12.5, and by disclosing a numerical rule that gives a first approximation to the optimum caustic alkali concentration for a given protein concentration. With this assistance the required concentrations can then be found by conducting pilot experiments in which successively the protein concentration is varied and the caustic alkaline concentration is varied by small increments and decrements until a viscous solution which can be kept for a reasonable time before it loses its spinnable characteristics is obtained.

These caustic alkaline peanut globulin solutions, which are made up at ordinary atmospheric temperatures, yield excellent filaments for textile purposes when they are spun into a suitable coagulating bath. Although when the caustic alkali concentration is appropriately chosen those hitherto known caustic alkaline solutions remain sufficiently stable to enable them to be spun for some time, they do not remain unchanged in their physical properties as long as would be desirable, and in particular changes in their viscosity terminate their useful life or introduce difficulties in continuous spinning after undesirably short periods of storage.

The formation of ammonia by alkaline hydrolysis of the globulin can be detected in the solution of the peanut globulin even at concentrations of alkali insufficient to form a globulin solution of pH 12.5, and becomes increasingly manifest as the alkali concentration is increased; and it may well be that the special difficulties encountered in the production of spinnable alkaline solutions of peanut globulin are to be attributed to destructive hydrolysis of the protein molecule taking place in a solution of which the alkalinity is no more than sufficient to effect the denaturation of the globulin.

We have now found that spinnable caustic alkaline solutions of peanut globulin of improved keeping qualities are obtained if a freshly prepared caustic alkaline solution of the peanut globulin is maintained at an elevated temperature between about 35° and 60° C. at least until it has attained its maximum viscosity, the said caustic alkaline solution being one made up with a concentration of caustic alkali not less than about 0.8 per cent calculated as sodium hydroxide but lower than the optimum caustic alkali concentration for the production of a spinnable solution of the same protein content for storage at ordinary temperature, and is then cooled to a lower temperature. The lower temperature to which the solution may be cooled may for instance be atmospheric temperature, for instance some temperature between 10 and 20° C., or it may be a temperature below atmospheric, preferably one at which water will not crystallise out from it.

The caustic alkali concentration required, according to the invention, to yield peanut globulin solutions characterised to the highest extent by stability of viscosity and other physical characteristics after they have been cooled to the aforesaid lower temperature is usually in the vicinity of 0.4 per cent., calculated as sodium hydroxide, lower than that required to yield solutions of the most suitable keeping characteristics of the same protein content when the solutions are made and stored at room temperatures. The precise alkali concentration, however, is dependent on the concentration of the globulin in the solution, and in order to prepare a suitably stored solution of a given viscosity by the method of the present invention a slightly higher concentration of a given sample of peanut globulin is ordinarily required than when the hitherto known technique is followed, and the higher the elevated temperature of storage according to the method of the present invention, the higher is the globulin concentration required. To obtain spinnable stored globulin solutions of suitable viscosities by the method of the present invention and by the hitherto known method, therefore, the actual caustic alkali concentrations employed to make up the respective solutions are usually less widely divergent than would be the case were the globulin concentrations the same. As in the case of the known method for making up the caustic alkaline solutions of the vegetable globulin, accordingly, it is desirable to carry out pilot experiments varying the protein concentration and the caustic alkali concentration by small increments and decrements. The better keeping qualities of the heated and cooled solution and the shorter time that the solution takes to reach a substantially steady viscosity after it has been first made up facilitate the conduct of these pilot experiments, and it is not always necessary to go through the whole series every time a new batch of peanut globulin is employed since an approximate estimate of a suitable protein and alkali concentration for spinning purposes can be made by observation of the tendency to gelate of solutions of substantially higher protein content than the solution to be spun when the alkali concentration is varied. It is preferred to employ sodium hydroxide as the caustic alkali, but other strong alkalies such as potassium hydroxide may be used in the chemically equivalent concentrations.

The invention is further illustrated by the following examples:

*Example I*

A mixture of 31 grams of a sample of peanut globulin made up in 100 ccs. of aqueous sodium hydroxide solution containing 1.7 per cent. by weight of sodium hydroxide was first prepared at 20° C. and was at once heated to 50° C. at which temperature it was maintained for 20 hours, by which time its viscosity had risen to a maximum and had started to fall a little, and then cooled to 20° C. The resulting solution was spun successfully into a coagulating bath containing an aqueous solution of sodium sulphate acidified with sulphuric acid immediately after it had been cooled, after 5 days, after 8 days, and after 11 days respectively. The filaments when suitably insolubilised were found to have excellent strength and good elongation.

*Example II*

The peanut globulin employed was from a different batch from the sample used in Example I. A solution made up from this material having a composition of 30% peanut globulin and 1.2% sodium hydroxide was heated to 50° C. half an hour after it was made up and matured at that temperature for 20 hours. It was then cooled to 20° C. The pH of the cooled solution, as determined colorimetrically was 10.9. The solution remained spinnable for more than a week thereafter, yielding textile filaments of good quality without difficulty when extruded into a warm acidified sodium sulphate bath and removed from the bath at a linear rate exceeding the rate of extrusion, the filaments being subsequently insolubilised.

Solutions prepared in accordance with our invention have been spun successfully for periods ranging from one to four weeks after they have been cooled to room temperature, but after storage for a longer period they tend to putrefy, whereas the caustic alkaline solutions of peanut globulin prepared in the hitherto known manner have always lost their suitability for spinning before putrefaction set in.

We claim:

1. The process for obtaining a viscous aqueous caustic alkaline solution of a peanut globulin suitable for the production of textile filaments by spinning even after storage for at least a week, which comprises preparing a solution having a pH of less than 12.5 of a peanut globulin in an aqueous caustic alkali solution, the concentration of said alkali in said peanut globulin solution being not less than about 0.8% calculated as sodium hydroxide, thereafter maintaining the resultant freshly prepared solution at an elevated temperature within the range of from 35° C. to 60° C. for at least several hours until said solution has attained its maximum viscosity, cooling said solution to a temperature within the range of from 10° C. to 20° C. and thereafter maintaining the same at atmospheric temperature until said solution is required for spinning.

2. The process for obtaining a viscous aqueous sodium hydroxide solution of a peanut globulin suitable for the production of textile filaments by spinning even after storage for at least a week, which comprises preparing a solution having a pH of less than 12.5 of a peanut globulin in a sodium hydroxide solution, the concentration of said sodium hydroxide in said peanut globulin solution being not less than about 0.8%, thereafter maintaining the resultant freshly prepared solution at an elevated temperature within the range of from 35° C. to 60° C. for at least several hours until said solution has attained its maximum viscosity and then cooling said solution to a temperature of not more than 20° C.

3. The process for obtaining a viscous aqueous caustic alkaline solution of a peanut globulin suitable for the production of textile filaments by spinning even after storage for at least a week, which comprises preparing a solution having a pH of less than 12.5 of a peanut globulin in an aqueous caustic alkali solution, the concentration of said alkali in said peanut globulin solution being not less than about 0.8% calculated as sodium hydroxide, thereafter maintaining the resultant freshly prepared solution at an elevated temperature within the range of from 35° C. to 60° C. for at least several hours until said solution has attained its maximum viscosity and then cooling said solution to a temperature of not more than 20° C.

ROBIN H. K. THOMSON.
STANLEY R. SWIFT.

REFERENCES CITED

The following references are of record in the file of this patent:

UNITED STATES PATENTS

| Number | Name | Date |
|---|---|---|
| 2,230,624 | McLean | Feb. 4, 1941 |
| 2,340,909 | Traill et al. | Feb. 8, 1944 |
| 2,342,994 | Atwood | Feb. 29, 1944 |
| 2,358,219 | Dickson et al. | Sept. 12, 1944 |

FOREIGN PATENTS

| Number | Country | Date |
|---|---|---|
| 537,740 | British | July 4, 1941 |